United States Patent
Yoshikawa et al.

(10) Patent No.: US 8,467,402 B2
(45) Date of Patent: Jun. 18, 2013

(54) DIGITAL AUDIO COMMUNICATION SYSTEM

(75) Inventors: Yoshinari Yoshikawa, Los Altos, CA (US); Kaoru Zeren, Sunnyvale, CA (US); Justin Mayer, Thousand Oaks, CA (US); Toshiaki Takada, San Jose, CA (US); Noriyuki Okada, San Jose, CA (US)

(73) Assignee: Miselu, Inc., Mountain View, CA (US)

( * ) Notice: Subject to any disclaimer, the term of this patent is extended or adjusted under 35 U.S.C. 154(b) by 901 days.

(21) Appl. No.: 12/557,445

(22) Filed: Sep. 10, 2009

(65) Prior Publication Data

US 2010/0061197 A1    Mar. 11, 2010

Related U.S. Application Data

(60) Provisional application No. 61/095,755, filed on Sep. 10, 2008.

(51) Int. Cl.
*H04L 12/28* (2006.01)
*H04L 12/56* (2006.01)

(52) U.S. Cl.
USPC ........ 370/420; 235/435; 348/14.01; 348/460; 348/462; 348/469; 375/295; 455/403

(58) Field of Classification Search
None
See application file for complete search history.

(56) References Cited

U.S. PATENT DOCUMENTS

| | | | |
|---|---|---|---|
| 6,349,220 B1 * | 2/2002 | Prior et al. | 455/566 |
| 6,522,347 B1 * | 2/2003 | Tsuji et al. | 715/848 |
| 6,621,508 B1 * | 9/2003 | Shiraishi et al. | 715/810 |
| 6,681,124 B2 * | 1/2004 | Prior et al. | 455/563 |
| 7,163,151 B2 | 1/2007 | Kiishinen | |
| 7,870,222 B2 * | 1/2011 | Kii | 709/217 |
| 8,108,462 B2 * | 1/2012 | Morotomi | 709/204 |
| 8,122,355 B2 * | 2/2012 | Kii et al. | 715/716 |
| 2001/0041590 A1 * | 11/2001 | Silberfenig et al. | 455/556 |

* cited by examiner

*Primary Examiner* — Ayaz Sheikh
*Assistant Examiner* — Blanche Wong
(74) *Attorney, Agent, or Firm* — Marsh Fischmann & Breyfogle, LLP; Robert G. Crouch

(57) ABSTRACT

Embodiments of the present invention allow users to post or publish audio information to a destination on a digital network. A particular embodiment provides a user interface for recording and uploading a short comment, remark, song segment, sound effect or any other audio portion. The comment can be sent directly to another user's device or can be published or uploaded to a network site, web page, user group or other location. A user interface allows organizing, reviewing, editing, tagging, transferring and other types of processing or manipulation in association with the audio portion to be transferred, or which has been received.

19 Claims, 3 Drawing Sheets

DIGITAL AUDIO COMMUNICATION SYSTEM

CLAIM OF PRIORITY

This application claims priority from U.S. Provisional Patent Application Ser. No. 61/095,755 filed on Sep. 10, 2008, entitled "DIGITAL AUDIO COMMUNICATION SYSTEM" which is hereby incorporated by reference as if set forth in full in this document for all purposes.

BACKGROUND

The immense popularity and usefulness of digital networks such as the Internet, corporate and campus local area networks (LANs), home networks, wireless networks (e.g., Bluetooth, Fire Wire 802.11x, ad hoc (computer-to-computer)), etc. has resulted in many communication benefits. Digital transmission and processing systems allow users of networks to exchange information in many forms. For example, text and images have traditionally been highly used and there are many mechanisms in use today for users to exchange text such as email, documents, text messages, blog posting, etc. Images can also be readily exchanged in the form of graphics, photographs, slides, video, etc. However, the exchange of audio information has usually focused on transferring discrete files, such as songs, lectures, video, etc., or has been the subject of real-time exchanges such as with Internet Protocol (IP) phones or other digital conversation methods.

SUMMARY

Embodiments of the present invention allow users to post or publish audio information to a destination on a digital network. A particular embodiment provides a user interface for recording and uploading a short comment, remark, song segment, sound effect or any other audio portion. The comment can be sent directly to another user's device or can be published or uploaded to a network site, web page, user group or other location. A user interface allows organizing, reviewing, editing, tagging, transferring and other types of processing or manipulation in association with the audio portion to be transferred, or which has been received.

For example, in one embodiment text, images, geographic location or other information or content can be tagged or otherwise associated with the audio portion to provide additional options or features. Lists and timelines are used to help create and organize the audio portions. One user interface for a portable computing device allows a user to record an audio portion of a limited duration. A progress bar indicates the time remaining during audio recording. Once the recording has been completed the user can associate additional content with the audio portion and transfer the audio portion to a destination.

A further understanding of the nature and the advantages of particular embodiments disclosed herein may be realized by reference to the remaining portions of the specification and the attached drawings.

DETAILED DESCRIPTION OF EMBODIMENTS

FIGS. 1A-E illustrate screen displays of a user interface of a particular embodiment. Particular embodiments are manufactured and/or distributed by Miselu, Inc., of Mountain View, Calif. It should be apparent that many variations on specific controls, displays, audio processing, functional steps or other inputs/outputs and steps or actions are possible and may be within the scope of the invention. Although a particular type of device, e.g., a cell phone, is used for purposes of illustration, it should be apparent that any other suitable digital processing device may be used. Although a particular input mode may be described, such as tapping a button or sliding a control, in general any type of user input device, control, sensing or activation mechanism may be employed unless otherwise noted. For example, alternative devices may use voice activation, gesture recognition, facial recognition, three dimensional or virtual reality input or output, etc.

Figure 1B:
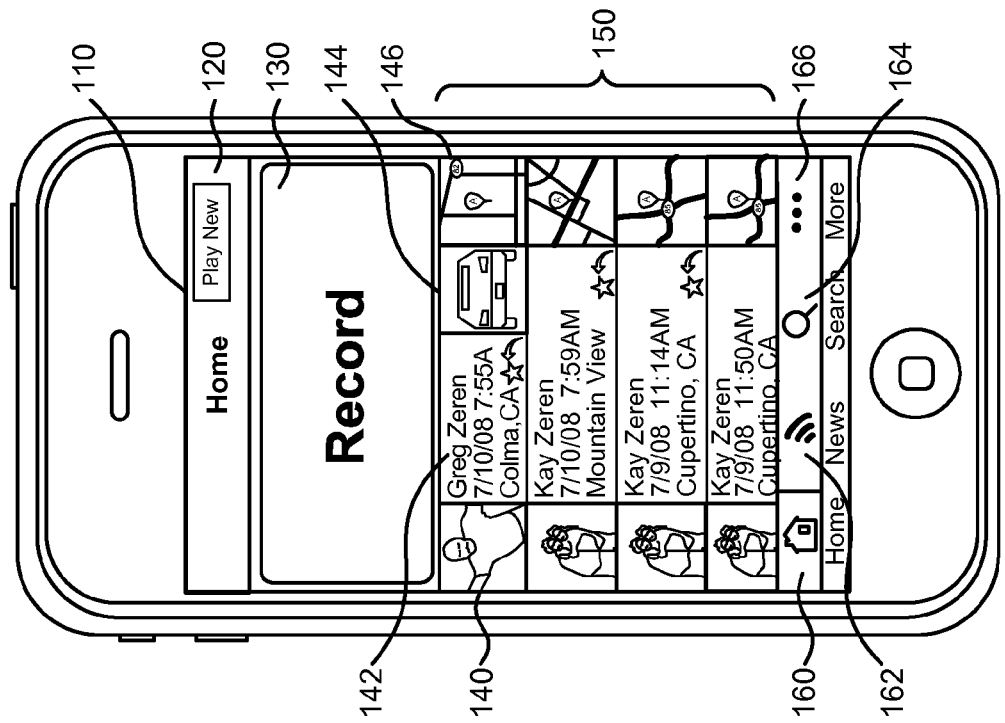
FIG. 1B is a second screen display of a user interface of a particular embodiment.
Figure 1A:
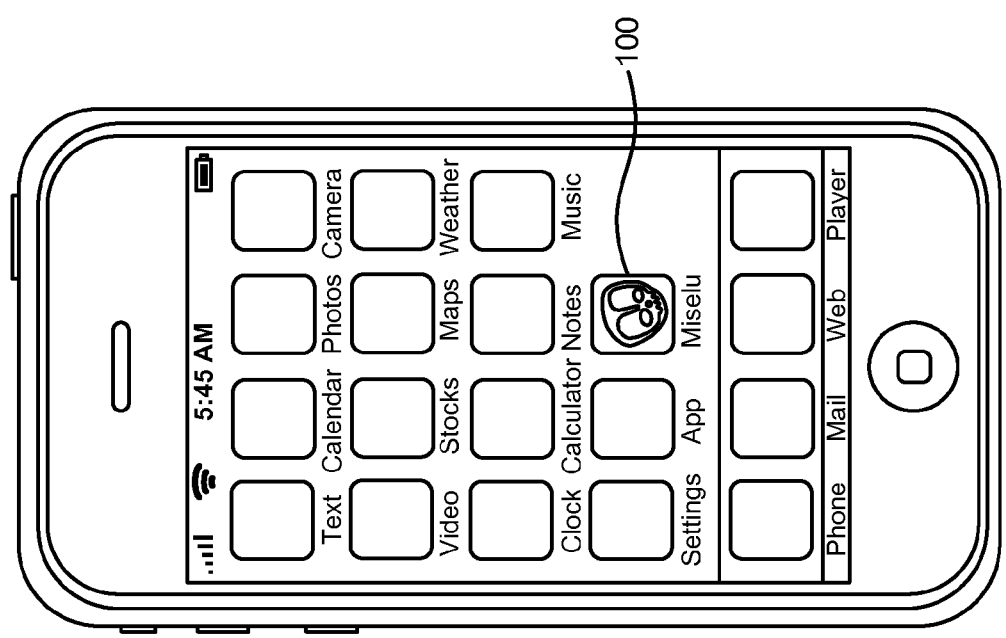
FIG. 1A is a first screen display of a user interface of a particular embodiment.

FIG. 1A illustrates a selection icon 100 that corresponds to an audio recording interface. As is known in the art, selection icon 100 can reside in an operating system environment on a device such as the cell phone pictured in FIG. 1A that includes several other icons or selections which correspond to other functionality or applications. Other devices may be suitable for use with features described herein. For example, any suitable computing system such as a desktop, laptop, notebook, sub-notebook, ultra-portable, tablet or other computer; personal digital assistant (PDA), music player, camera or other type of device may be used. In other embodiments, a dedicated hardware system may be employed that is designed primarily or exclusively for audio recording and transfer.

Once a user has selected icon 100, the screen shown in FIG. 1B is displayed. Title bar 110 indicates that the screen in FIG. 1B is the home screen for the audio recording interface. Within title bar 110 is "Play New" button 120. When activated, this button initiates playback of the most recent 20 unheard recordings (number is user-configurable). Record button 130 is prominently displayed as a large button since it is usually of primary interest to a user after the user has selected icon 100. A list 150 of previous transmissions is shown in reverse chronological order below the record button. Each row in the list corresponds to an entry that includes an audio portion that was transferred—either sent or received by the user of the device.

In a particular embodiment, each entry in list 150 includes image 140 of the originator of the associated audio portion corresponding with the entry. Text 142 includes the originator's name, date of transmission, and location (e.g., city/state) of transmission. additional information can be added as "tags" such as image tag 144, or geo-tag 146. In a particular embodiment, geo-tags such as 146 can be automatically generated by the device by using a location sensing mechanism (e.g., Global Positioning System (GPS), cell tower triangulation, WiFi/hotspot triangulation, etc.). Tags such as image, geo, text or other content can be automatically or manually generated, or they may be generated by a combination of automatic and manual steps such as where the device asks the user if the user wants to allow geo-tagging where the device's location has been automatically sensed and associated with a graphical map location. The audio portion corresponding with an entry can be played back by tapping in the whitespace of the entry. It should be apparent that many variations on ways to display audio portion entries are possible.

Navigation buttons at the bottom of the screen include Home Page button 160, News button 162, Search button 164 and More button 166. These provide the user with a quick way to jump to other pages or screens that may be associated with audio portion recording and transmissions. For example, Home Page button 160 brings the user to the page shown in FIG. 1B. News button 162 opens a section where users can have recent news headlines played back to them via text-to-voice synthesis. Search button 164 allows the user to search entries by using keywords, tags or metadata, or other options. More button 166 displays additional navigation buttons. Any number and type of navigation buttons may be provided to allow quick access to one or more of the features described herein, or to allow the user to access other functions with the device.

Figure 1D:
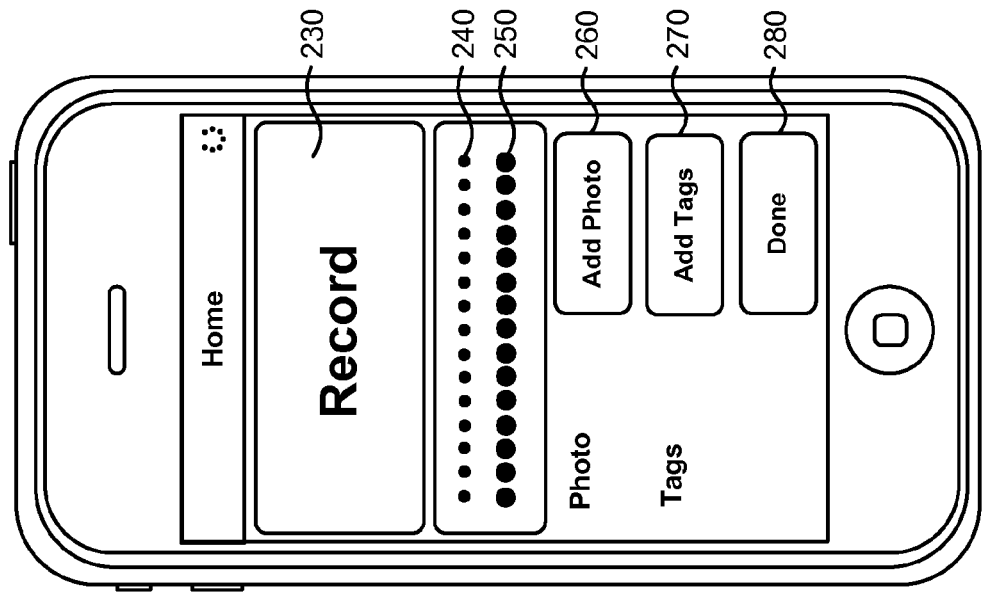
FIG. 1D is a fourth screen display of a user interface of a particular embodiment.
Figure 1C:
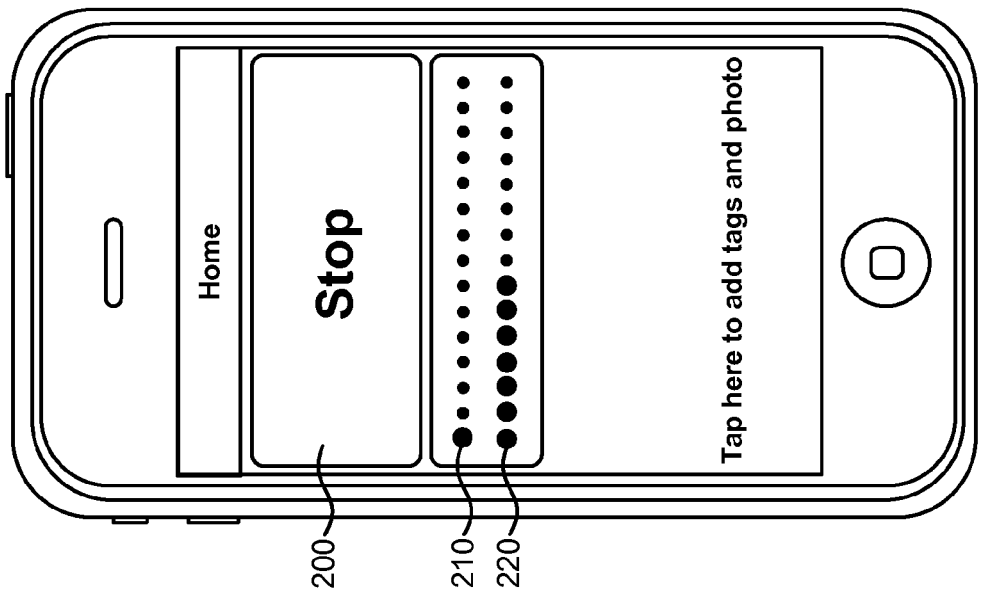
FIG. 1C is a third screen display of a user interface of a particular embodiment.

Assuming the user has pressed Record button 130 of FIG. 1B, the screen display of FIG. 1C is presented. In FIG. 1C, Record button 130 has been replaced with Stop button 200 and recording has been initiated automatically. Meter bar 210 shows the audio input level while recording. This meter can indicate, for example, a signal strength being received by a microphone in the device. Progress bar 220 lights up successive dots from left to right as time elapses and the recording is underway. In a particular embodiment a predetermined fixed interval of 5 seconds is used as the recording interval. Other embodiments can vary the time interval. A restricted time interval may be useful in order to simplify the interface and to prevent long (either intentional or unintentional) recordings from being created and sent. In a particular embodiment, an interval of 5 seconds has been found to allow a reasonable amount of voice comment without being too restrictive. Other embodiments may allow different fixed intervals in the range of 3-60 seconds. Other intervals may be used.

Yet other embodiments can use different approaches to determine interval duration. For example, service providers, device manufacturers, site operators, application developers (e.g., email, chat, etc.) can set the interval duration. Or the user can be allowed to change the duration. In some systems the user may be charged depending upon how long a duration each audio interval is set. An administrator or someone with group privileges may set the duration and other usage restrictions if, for example, the device is used in a company.

Other variations on setting the interval are possible. For example, the interval can be a "soft" interval such that if a user continues to talk past the end of the interval the audio is still recorded for a small amount of time. The audio can be made to be cut off completely at the end of the interval or can fade out. Other approaches are possible.

In FIG. 1C, as progress bar 220 proceeds to illuminate dots until it reaches the rightmost dot the user can continue speaking or recording while they are provided with a clear indication of how much time is left to record. Once the progress bar reaches the end the screen display changes to that of FIG. 1D.

In FIG. 1D, recording has ended as a result of the interval duration being reached as shown by progress bar 250. The Stop button has changed back to Record button 230. Meter bar 240 is turned off to show that no signal is being recorded. Alternatively, the meter bar can remain enabled so the user can see the signal level to know how close or far to position the device from their mouth or other sound source in order to make a recording of suitable volume. Content buttons for adding a photo or tag are shown at 260 and 270, respectively.

The recording can be played back so the user can check that they are satisfied with the recording. Then the user can select Done button 280 to save the recording or a "Send To" button (not shown) to send the audio portion just recorded to the last person from whom the user's device has received an audio portion. Alternatively the user can select a recipient from a list such as an address book or contacts list, from the entries list in FIG. 1B, by typing in all or a portion of a person's name, or by other means. If the user wishes to re-record the audio portion then Record button 230 can be selected and the actions described above in reference to FIG. 1C can be repeated to create another audio recording to be used in place of the last one, which is discarded. In other embodiments, each recording may be saved in a history or similar list so that the user can choose from among which one of several "takes" to select for transmission.

Figure 1E:
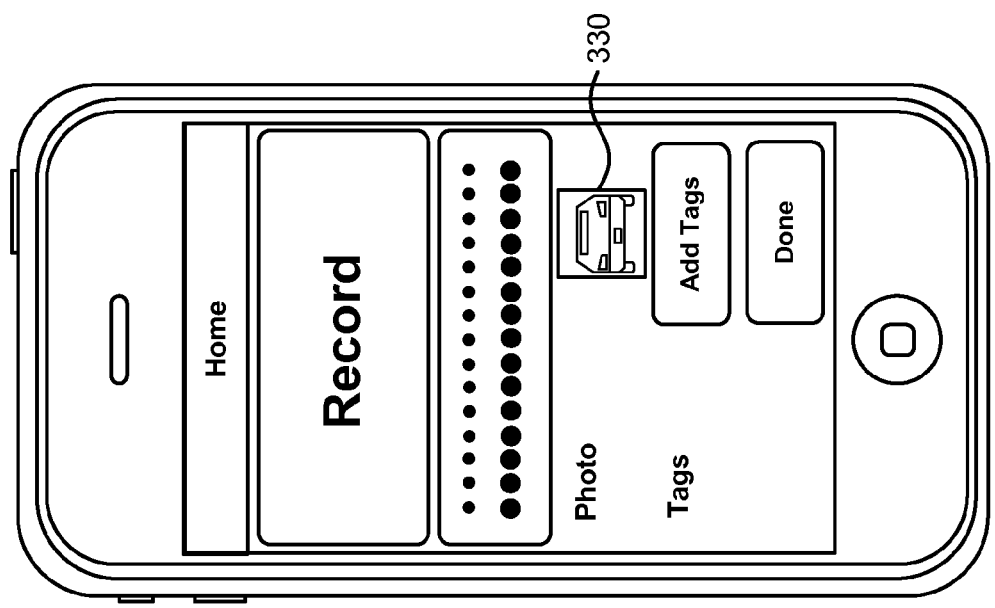
FIG. 1E is a fifth screen display of a user interface of a particular embodiment.

FIG. 1E shows the screen display after the user has selected Add Photo button 260 of FIG. 1D. In FIG. 1E, image 330 has been captured by the device's camera and is shown on the screen as it will appear as an item associated with the recorded audio portion when the audio portion is sent. Other ways to associate a photo or image with the audio portion are possible. For example, the user can select the image from a collection of images in the devices file system, from a network location (e.g., web site), from a different application (e.g., email, photo organizer), etc.

Other types of content or metadata can be associated with the audio portion by using the Add Tags button. For example, text keywords can be associated with the audio portion's entry. A message, words, characters or other symbols can be typed or drawn and included as part of the audio portion entry.

Additional features can be included. For example, top-level navigation buttons such as Home, Archive, Replies, and Friends can be provided. The Home button can return the user to the home page as described above. The display on the home page can include a reverse chronological list of friends' recordings. An Archive button can provide a page with a reverse chronological list of the user's own recordings. If the device is turned horizontally then a timeline view can be presented showing the occurrences of the user's recordings spaced according to when the recordings were made.

A Replies button can provide a page that shows threads of conversations between users. A Friends button can provide a page that is used to manage friend and group lists. A More button can be used to display additional pages or options such as a Preferences page to set user preferences or allow configuration of buttons.

In a particular embodiment, all lists have 20 tracks per screen by default, with pagination. This number can vary among different applications, versions, in response to user preference setting, depending upon device screen size or orientation, etc. Tapping on a user's photo icon can produce a reverse chronological list of recent recordings by the user. Tapping on an area to the right-hand side of the screen can show a photo if one is associated with the audio, or a default map image showing the location of a user when the user made the audio recording.

A "Play New" button can be included in the top navigation for all lists (e.g., lists for Latest, Archive, User). Tapping the Play New button can play all the unheard tracks in the current list sequentially in a particular order such as reverse chronological order, or chronological order. For example, if viewing a list of 20 tracks, nine of which have not yet been heard by the user, tapping the Play New button can play the nine unheard tracks in reverse chronological order. If an audio track is spoken voice, a right-facing "play" arrow icon can appear at the right of a row in the list. If it is a music track, a musical note icon can be shown instead.

A user can bring up a list of the latest (e.g., most recently made or most recently received) recordings. Each recording can be associated with a recording user's photo icon as described above. Tapping on the photo icon brings up a list of all recordings sent to the user by the recording user who is associated with the photo icon.

Other possible features include allowing a user to select a pre-existing photo instead of shooting a new one. Video capture can be provided. When connectivity is poor or unavailable, recordings can be cached to a local file system for later automatic upload. Text included as meta-data associated with a recording can be searched. A text-to-speech process can allow searching of words or phrases in recordings.

A user can create a group, such as a group of the user's grandchildren that allows listening to all audio clips from members of the group by selecting the group or pressing a button or icon associated with the group. Playback of multiple new (i.e., not listened to yet) recordings from the group members can be in reverse chronological order of receipt. Or could playback can be according to each member so that all recordings form a group member are played back first and then the next member's recordings, and so on.

Users can change their setting on how the playback happens, as some people may want to listen to the latest first for contents such as news. One feature can provide a way to either notify the user that the upload didn't happen or hold the recording until the user enters an area where there is coverage and then complete the upload. The upload can have a time and date stamp so that the location of the user when the recording was made can be extrapolated by estimating rate of travel with the present location at upload, present time at upload and prior time stamp of the recording.

A map display can be used as the basis for the user interface. A user can run a finger along interested areas of the map like a theme park's location. Voices captured from the area will be replayed as the finger runs over the recorded section allowing you to get a sense of how people are feeling about that location. No need to know the identity of the people speaking on the recordings. Using position location information for the playback device, recordings can be played at volumes that are proportional to the distance the recording was recorded from the user's current position. Voices that were recorded from farther away are softer while voices that were recorded from nearer locations are louder.

A filter can be used to select or block recordings with different types of moods. For example, "happy," or "excited" types of recordings can be selected or blocked. The classification of such voice attributes can be by using text metadata entered by the speakers, by using human or automated classification techniques, etc.

FIG. 2 shows basic hardware that can be used to practice embodiments of the invention. In FIG. 2, device 400 includes processor 404 coupled to display 402, storage 406, audio input 408, audio output 410 and user input 412. In general, any suitable types of present or future components can be used to achieve the functionality of the subsystems shown in FIG. 2. The interconnection of these subsystems can vary as a matter of design choice. In some applications, subsystems may be omitted from the device. For example, if a device is only being used to record and send then audio output 410 can be omitted. Additional subsystems or components can be included in the device.

Device 400 is in communication with other devices 432, 434, 436 having similar functionality via network 420 that can be a digital network such as the Internet, a LAN or other network or communication scheme. In general, any type of communication system can be used such as wired, wireless, computer network, phone system, etc. It should be apparent that many variations are possible without deviating from the scope of the claimed invention.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors in one or more same or different locations. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for transferring an audio portion via a digital network, the method comprising:
   displaying a control;
   accepting a signal from a user input device to indicate user activation of the control;
   entering a recording mode for recording audio;
   displaying a progress bar indicating an amount of recording time remaining;

updating the progress bar as recording of the audio proceeds;
transferring the audio recording to a destination via the digital network;
identifying a name of a recipient to receive the audio recording;
providing a tag associated with the recording; and
transferring an indication of the audio recording and tag to the recipient.

2. A method for transferring an audio portion via a digital network, the method comprising:
displaying a control;
accepting a signal from a user input device to indicate user activation of the control;
entering a recording mode for recording audio;
displaying a progress bar indicating an amount of recording time remaining;
updating the progress bar as recording of the audio proceeds;
transferring the audio recording to a destination via the digital network;
automatically determining location information for the recording; and
transferring the location information to the destination in association with the audio recording.

3. The method of claim 2, further comprising:
accepting signals from the user input device to determine one or more recipients for the audio recording.

4. The method of claim 2, further comprising:
wherein a plurality of completed audio recordings are shown on a timeline view.

5. A method for transferring an audio portion via a digital network, the method comprising:
displaying a control;
accepting a signal from a user input device to indicate user activation of the control;
entering a recording mode for recording audio;
displaying a progress bar indicating an amount of recording time remaining;
updating the progress bar as recording of the audio proceeds;
transferring the audio recording to a destination via the digital network;
predefining a fixed amount of time in which to record audio for the audio recording.

6. The method of claim 5, further comprising:
automatically exiting the recording mode at the end of the fixed amount of time.

7. The method of claim 6, further comprising:
displaying a RECORD button at the end of the fixed amount of time, wherein the RECORD button can be selected by the user to re-enter the recording mode to re-record the audio recording.

8. The method of claim 6, further comprising:
displaying one or more buttons upon exiting the recording mode.

9. The method of claim 8, wherein a button includes a content button for adding a photo.

10. The method of claim 8, wherein a button includes a DONE button to indicate that recording is completed.

11. The method of claim 5, further comprising:
accepting signals from the user input device to determine one or more recipients for the audio recording.

12. The method of claim 5, further comprising:
wherein a plurality of completed audio recordings are shown on a timeline view.

13. A method for transferring an audio portion via a digital network, the method comprising:
displaying a control;
accepting a signal from a user input device to indicate user activation of the control;
entering a recording mode for recording audio;
displaying a progress bar indicating an amount of recording time remaining;
updating the progress bar as recording of the audio proceeds;
transferring the audio recording to a destination via the digital network;
accepting signals from the user input device to determine one or more recipients for the audio recording.

14. A method for transferring an audio portion via a digital network, the method comprising:
displaying a control;
accepting a signal from a user input device to indicate user activation of the control;
entering a recording mode for recording audio;
displaying a progress bar indicating an amount of recording time remaining;
updating the progress bar as recording of the audio proceeds;
transferring the audio recording to a destination via the digital network;
wherein a plurality of completed audio recordings are shown on a timeline view.

15. A method for transferring an audio portion via a digital network, the method comprising:
displaying a control;
accepting a signal from a user input device to indicate user activation of the control;
entering a recording mode for recording audio;
displaying a progress bar indicating an amount of recording time remaining;
updating the progress bar as recording of the audio proceeds;
transferring the audio recording to a destination via the digital network;
displaying a map with indicators to show where prior audio recordings were recorded.

16. The method of claim 15, further comprising:
accepting signals from the user input device to determine one or more recipients for the audio recording.

17. The method of claim 15, further comprising:
wherein a plurality of completed audio recordings are shown on a timeline view.

18. A method for transferring an audio portion via a digital network, the method comprising:
displaying a control;
accepting a signal from a user input device to indicate user activation of the control;
entering a recording mode for recording audio;
displaying a progress bar indicating an amount of recording time remaining;
updating the progress bar as recording of the audio proceeds;
transferring the audio recording to a destination via the digital network;
determining a mood of speech in the audio recording.

19. The method of claim 18, further comprising:
filtering a plurality of audio recordings according, at least in part, to the mood.

* * * * *